W. O. SHADBOLT.
FIFTH WHEEL FOR VEHICLES.
APPLICATION FILED FEB. 10, 1916.

1,213,280. Patented Jan. 23, 1917.

William Oscar Shadbolt, Inventor
By his Attorney
Edmond Congan Brown

UNITED STATES PATENT OFFICE.

WILLIAM OSCAR SHADBOLT, OF BROOKLYN, NEW YORK.

FIFTH-WHEEL FOR VEHICLES.

1,213,280.　　　　　Specification of Letters Patent.　　Patented Jan. 23, 1917.

Application filed February 10, 1916. Serial No. 77,479.

*To all whom it may concern:*

Be it known that I, WILLIAM OSCAR SHADBOLT, a citizen of the United States, and a resident of the borough of Brooklyn, in the city and State of New York, have invented certain new and useful Improvements in Fifth-Wheels for Vehicles, of which the following is a specification.

The invention relates to fifth wheels, such as are employed for pivotally connecting the front axles of vehicles to the reach or to the body of the vehicle, and which may also be employed for the purpose of providing a pivotal connection between a tractor and a truck body; and has for its object to provide such a fifth wheel which shall obviate certain of the disadvantages of such devices previously known and which shall possess certain advantages over prior devices, as hereinafter explained.

The invention consists in the novel construction, arrangement and combination of various devices, elements and parts, as shown in the accompanying drawings, and hereinafter more particularly described.

Figure 1:
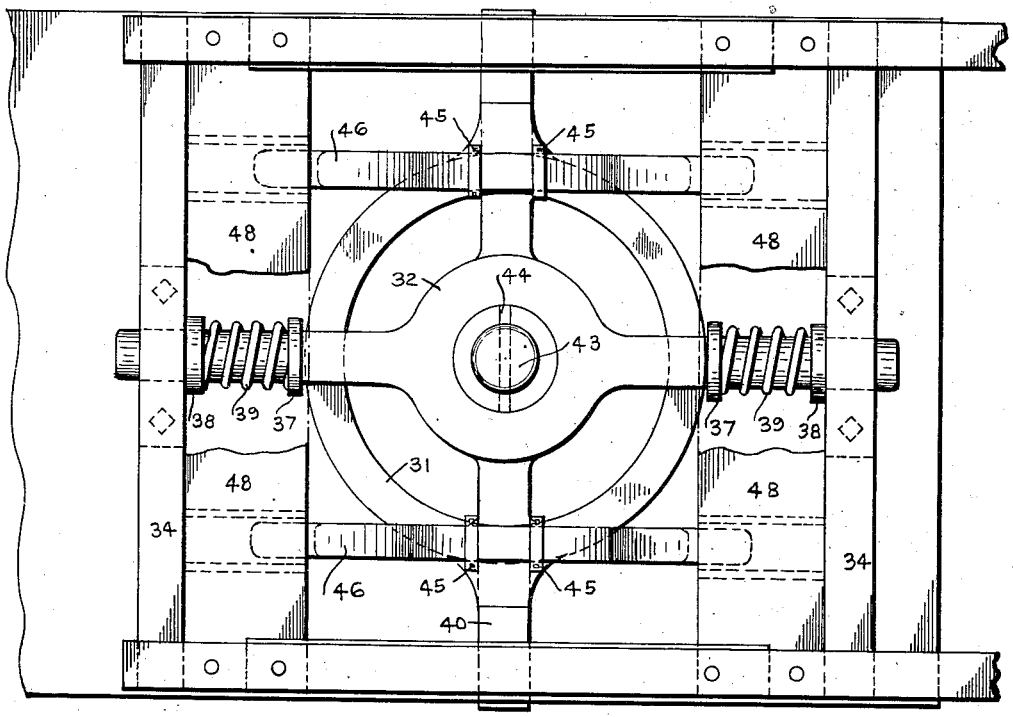
Figure 2:
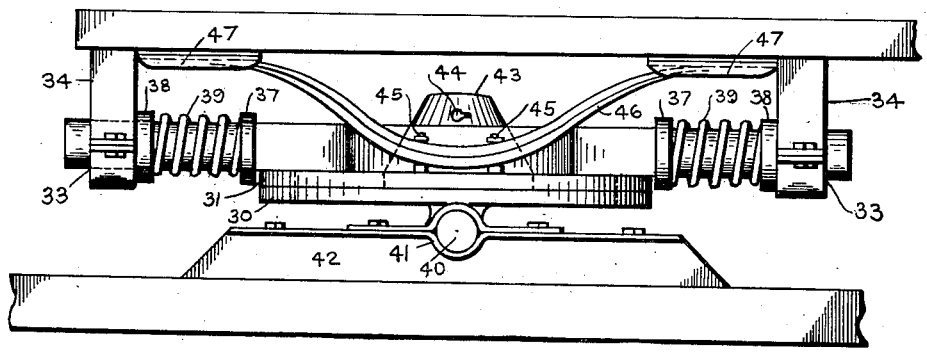

In the said drawings, Figure 1 is a plan view of my invention; and Fig. 2 is a side elevation thereof.

In carrying my invention into effect in the embodiment thereof which I have selected for illustration in the accompanying drawings and description in this specification, I provide a fifth wheel comprising two annular members 30 and 31. The upper member 31 is provided with a diametrically extending member 32, the middle part of which is split so as to assume an annular form and the ends of which project beyond the periphery of the annular member 31 and are journaled in sockets 33 in cross bars 34 which extend across between longitudinal beams 35 secured to the under side of a truck body or the like. The projecting portions of the member 32 are free to move longitudinally to a certain extent in said sockets. Fast on said projecting portions, adjacent to the periphery of the annular member 31, are annular shoulders 37, and loose on said projecting members, inside the cross bars 34 are washers 38. Between the shoulders 37 and the washers 38 I interpose helical springs 39. The lower annular member 30 is provided with a diametrically extending member 40, the projecting ends of which are journaled in sockets 41 in beams 42 on the frame of the tractor.

From the portion of the diametrically extending member 40 which is inside of the annular member 30 extends upward a conical member 43, which is in part analogous to the king-bolt in the ordinary form of fifth wheel. This conical member is adapted, when the two annular members are assembled, to project up through the opening in the annular portion of the diametrically extending member 32, and the said conical member 43 is provided with a transverse opening 44 above the plane of the upper surface of the annular portion of the member 32, which opening is adapted to receive a pin or bolt which serves to prevent the separation of the two annular members under strain.

I provide semi-elliptical springs 46, the middle portions of which are bolted to the member 31 at 45, and the extremities of which are free to slide in bearings 47 in plates 48 extending across between the longitudinal beams 35. It will be seen that the springs 46 serve to prevent undue swaying of the truck from side to side, the ends sliding in the bearings 47 as the spring is flattened out or allowed to assume its normal form, and as the truck body and plates 47 slide forward or back with relation to the fifth wheel member 31 and its said attached springs 46.

I do not limit myself to the exact form described. It is obvious that it is possible to employ the springs 46 on a fifth wheel of a type having the shock-absorbing springs analogous to the springs 39, located below the fifth wheel members; and that various other changes might be made, without departing from the spirit and scope of my invention.

Having thus described my invention, what I claim as new and desire to secure by Letters Patent is as follows:

1. A fifth wheel comprising an upper member provided with lateral projections and journaled under the frame of a vehicle, a lower member secured to devices below the vehicle, means adapted to pivotally connect the said members together, and a spring acting between said first named member and the under side of said vehicle; said spring always remaining in a line parallel with the longitudinal axis of said vehicle.

2. A fifth wheel comprising an upper member provided with lateral projections and journaled under the frame of a vehicle,
} a lower member secured to devices below the vehicle, means adapted to pivotally connect the members together, bearing portions located on the under side of said vehicle, and a semi-elliptical spring having its central portion secured to said first named member, and having ends adapted to slide in said bearing portions.

3. A fifth wheel comprising an upper member provided with lateral projections and journaled under the frame of a vehicle, a lower member secured to devices below the vehicle, means adapted to pivotally connect the members together, a bearing portion located on the under side of said vehicle, and a spring having a portion secured to said first named member, and having a portion adapted to slide in said bearing portion.

4. A fifth wheel comprising an upper member provided with lateral projections and journaled under the frame of a vehicle, a lower member secured to devices below the vehicle, means adapted to pivotally connect the said members together, and a spring acting between said first named member and the under side of said vehicle; said fifth wheel and spring being adapted to slide longitudinally with relation to said vehicle.

In witness whereof I have hereunto signed my name this 7th day of February, 1916.

WILLIAM OSCAR SHADBOLT.